(12) United States Patent
Fitch et al.

(10) Patent No.: US 7,930,243 B1
(45) Date of Patent: Apr. 19, 2011

(54) METHOD AND SYSTEM FOR MANAGEMENT OF FINANCIAL ACCOUNTS

(75) Inventors: Todd Matthew Fitch, Santa Clara, CA (US); James R. Del Favero, Redwood City, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 12/756,337

(22) Filed: Apr. 8, 2010

Related U.S. Application Data

(63) Continuation of application No. 11/932,862, filed on Oct. 31, 2007, now Pat. No. 7,725,387.

(51) Int. Cl.
*G06Q 40/00* (2006.01)

(52) U.S. Cl. .......................................................... 705/38

(58) Field of Classification Search .............. 705/30–45; 235/379; 379/145; 380/247; 455/408; 463/25; 713/182
See application file for complete search history.

(56) References Cited

U.S. PATENT DOCUMENTS

| | | | |
|---|---|---|---|
| 5,825,003 A * | 10/1998 | Jennings et al. .............. 235/379 |
| 6,988,658 B2 | 1/2006 | Smith | |
| 7,024,389 B1 | 4/2006 | Watkins | |
| 7,117,172 B1 * | 10/2006 | Black .............................. 705/35 |
| 7,233,929 B1 * | 6/2007 | Lingle et al. .................. 705/402 |
| 7,383,223 B1 | 6/2008 | Dilip et al. | |
| 7,873,573 B2 * | 1/2011 | Realini ........................ 705/39 |
| 2004/0049452 A1 * | 3/2004 | Blagg ............................ 705/39 |
| 2005/0086165 A1 * | 4/2005 | Pawelczyk et al. ............. 705/40 |
| 2005/0137949 A1 * | 6/2005 | Rittman et al. ................. 705/35 |
| 2005/0209958 A1 * | 9/2005 | Michelsen et al. .............. 705/39 |
| 2006/0004655 A1 | 1/2006 | Alexander et al. | |
| 2007/0055594 A1 | 3/2007 | Rivest et al. | |
| 2007/0244782 A1 * | 10/2007 | Chimento ....................... 705/35 |
| 2008/0301041 A1 * | 12/2008 | Bruk .............................. 705/39 |

FOREIGN PATENT DOCUMENTS

| WO | 200225534 A2 | 3/2002 |
|---|---|---|
| WO | 2004104757 A2 | 12/2004 |

* cited by examiner

*Primary Examiner* — James P Trammell
*Assistant Examiner* — Tien C Nguyen
(74) *Attorney, Agent, or Firm* — Osha • Liang LLP

(57) ABSTRACT

The invention relates to a method for managing a financial account. The method involves directing a primary transaction request to a holding account controlled by an account owner, evaluating the primary transaction request based on a selected rule to obtain an evaluation, routing the primary transaction request, based on the evaluation, from the holding account to the financial account of a plurality of financial accounts.

15 Claims, 5 Drawing Sheets

METHOD AND SYSTEM FOR MANAGEMENT OF FINANCIAL ACCOUNTS

CROSS-REFERENCE TO RELATED APPLICATIONS

This patent application is a continuation of U.S. patent application Ser. No. 11/932,862, filed on Oct. 31, 2007, and assigned to assignee of the present application. Accordingly, this patent application claims benefit of U.S. patent application Ser. No. 11/932,862 under 35 U.S.C. §120. U.S. patent application Ser. No. 11/932,862 is hereby incorporated in its entirety.

BACKGROUND OF INVENTION

Generally, in order to manage money, individuals, groups, businesses, governments and other account owners use a variety of financial accounts. Examples of financial accounts include, but are not limited to, investment accounts, savings accounts, checking accounts, retirement accounts, credit card accounts, and/or loans.

Different financial accounts generally have different attributes and accordingly are suitable for different purposes. For example, different financial accounts may have different limits, different policies, different fees, different interest rates, different payment dates, different balances, different fraud detection rules, different overdraft protection, different accessibility and a variety of other attribute differences. Accordingly, an account owner may distribute available funds over different financial accounts for different purposes.

For each financial transaction, an account owner is required to first select which financial account is suitable for the financial transaction and authorize an expense or deposit to the selected financial account. Each financial account may include different available balances and/or be associated with fraud detection rules that result in authorization or denial of the request for the financial transaction.

When a financial transaction is processed by a financial account with insufficient funds, an overdraft fee is generally charged to the account owner by the associated financial institution. In addition, a vendor requesting the financial transaction may charge a fee to the account owner for denial of the requested financial transaction. For example, most vendors generally charge a fee for a bounced check. Accordingly, even if the account owner has funds available in other financial accounts, the account owner may be charged fees for lacking funds in the selected financial account.

SUMMARY OF INVENTION

In general, in one aspect, the invention relates to a method for managing a financial account. The method involves directing a primary transaction request to a holding account controlled by an account owner, evaluating the primary transaction request based on a selected rule to obtain an evaluation, and routing the primary transaction request, based on the evaluation, from the holding account to the financial account of a plurality of financial accounts.

In general, in one aspect, the invention relates to a system for managing a financial account. The system comprises a holding account associated a plurality of financial accounts and controlled by an account owner, a plurality of rules associated with the holding account, a transaction management engine comprising functionality to: direct a primary transaction request to the holding account and evaluate the primary transaction request based on a rule selected from the plurality of rules to obtain an evaluation, and a transaction router comprising functionality to route the primary transaction request, based on the evaluation, from the holding account to a first financial account of a plurality of financial accounts.

In general, in one aspect, the invention relates to a computer readable medium. The computer readable medium comprises instructions for managing financial accounts, the instructions comprising functionality for: directing a primary transaction request to a holding account controlled by an account owner, evaluating the primary transaction request based on a selected rule to obtain an evaluation, and routing the primary transaction request, based on the evaluation, from the holding account to the financial account of a plurality of financial accounts.

Other aspects and advantages of the invention will be apparent from the following description and the appended claims.

DETAILED DESCRIPTION

Figure 1:
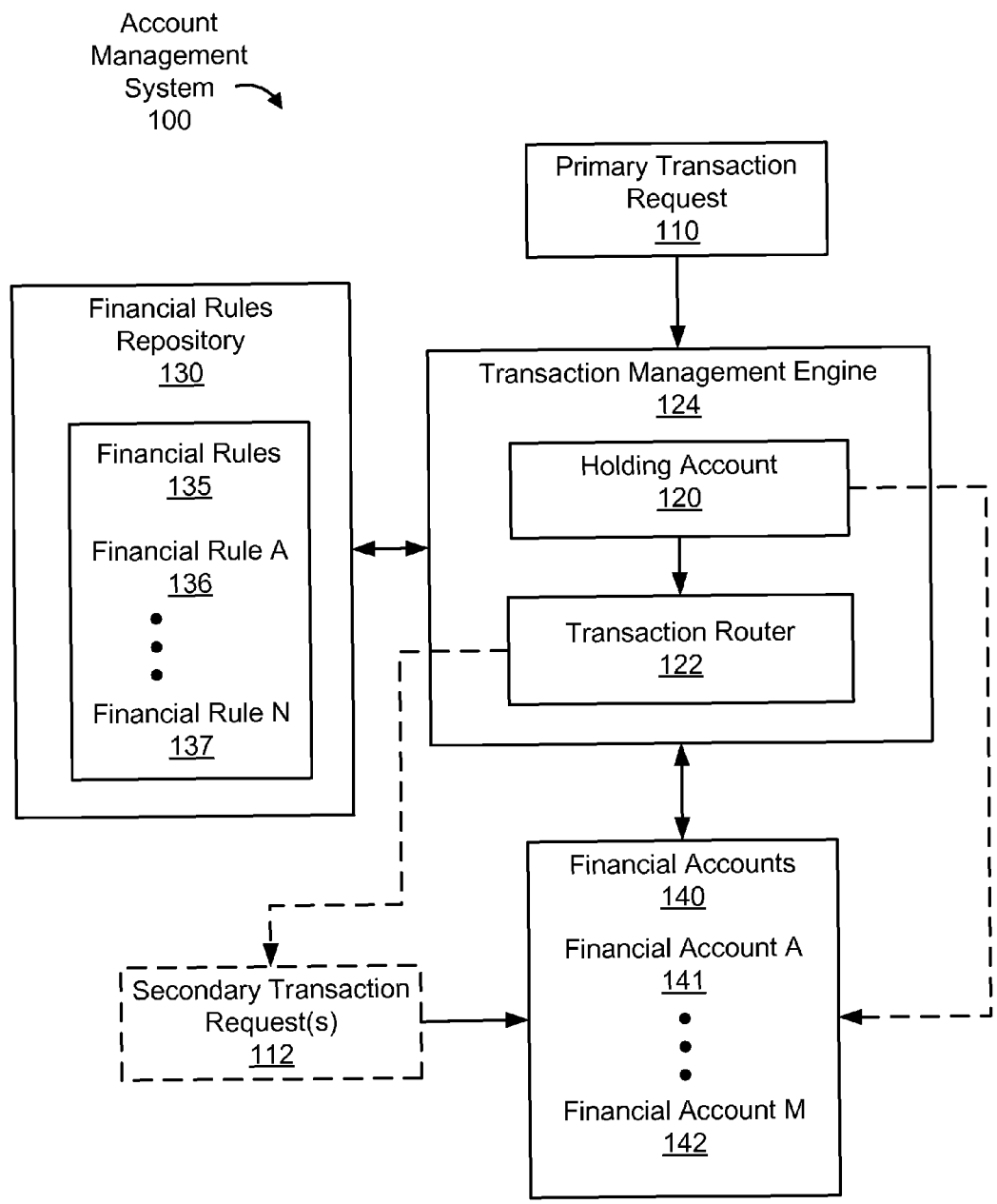
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method for managing a request for a financial transaction. Specifically, embodiments of the invention provide a method and system for obtaining a request for a financial transaction and redirecting the request based on financial accounts associated with the account owner.

FIG. 1 shows an account management system (100) in accordance with one or more embodiments of the invention. As shown in FIG. 1, the account management system (100) includes a transaction management engine (124), a holding account (120), a transaction router (122), financial accounts (140), a financial rules repository (130), a primary transaction request (110), and secondary transaction request(s) (112). Each of these components are described below and may be located on the same device (e.g., a server, mainframe, desktop personal computer (PC), laptop, personal desktop assistant (PDA), television, cable box, satellite box, kiosk, telephone, mobile phone, or other computing devices) or may be located on separate devices coupled by a network (e.g., Internet, Intranet, Extranet, Local Area Network (LAN), Wide Area Network (WAN), or other network communication methods), with wire and/or wireless segments.

In one or more embodiments of the invention, the account management system (100) is implemented using a client-server topology. The account management system (100) itself may correspond to an enterprise application running on one or more servers, and in some embodiments could be a peer-to-peer system, or resident upon a single computing system. In addition, the account management system (100) is accessible from other machines using one or more interfaces (not shown). In one or more embodiments of the invention, the account management system (100) is accessible over a network connection (not shown), such as the Internet, by one or more users. Information and/or services provided by the account management system (100) may also be stored and accessed over the network connection.

Continuing with FIG. 1, the primary transaction request (110) is a request for a transaction at one or more financial transactions, in accordance with one or more embodiments of the invention. In one or more embodiments of the invention, the primary transaction request (110) might be authorized by an account owner (not shown). The primary transaction request (110) may be made by a product vendor, a service vendor, a financial institution, an account owner and/or other entities that include functionality to request financial transactions. The primary transaction request (110) may be a one time financial transaction or a periodic financial transaction (e.g., automatic payments) associated with one or more financial accounts (140), described above. The primary transaction request be made using an account owner card (e.g., credit card, debit card, gift cards, or other card associated with the account owner), an account owner check (e.g., a bank check, a travelers check, a cashiers check or other check associated with the account owner), and/or other financial tool.

In one or more embodiments of the invention, the primary transaction request may provide additional information during the request. For example, a transaction requestor submitting a deposit for the account owner may indicate the type of financial account the account owner wishes to use for the deposit or may simply indicate the type of financial transaction (e.g., a business expense). In one or more embodiments of the invention, the primary transaction request may include a credit and/or a debit, a transfer of funds between different financial accounts (140), a new financial account initiation, a financial account closing, a financial account suspension, a sale of financial investments, cash withdrawal or any other financial transactions associated with one or more financial accounts.

In one or more embodiments of the invention, the financial rules repository (130) corresponds to a data repository that includes functionality to store rules (135). In one or more embodiments of the invention, access to the financial rules repository (130) is restricted and/or secured. As such, access to the financial rules repository (130) may require authentication using passwords, secret questions, personal identification numbers (PINs), biometrics, and/or any other suitable authentication mechanism.

Those skilled in the art will appreciate that elements or various portions of data stored in the financial rules repository (130) may be distributed and stored in multiple data repositories. In one or more embodiments of the invention, the financial rules repository (130) is flat, hierarchical, network based, relational, dimensional, object modeled, or structured otherwise. For example, the financial rules repository may be maintained as a table of a SQL database. In addition, data in the financial rules repository (130) may be verified against data stored in other repositories.

Continuing with FIG. 1, in one or more embodiments of the invention, the rules stored in the financial rules repository (130) are financial rules (135). The financial rules may be added, modified, and/or deleted by an account owner (or other authorized entity) using one or more interfaces (not shown). The interface may be adapted for use to access the account management system (100) and any services provided by the account management system (100). The interface may be a web interface, a graphical user interface (GUI), a command line interface, an application interface or any other suitable interface. The interface may also include one or more web pages that can be accessed from a computer with a web browser and/or internet connection. Alternatively, the interface may be an application that resides on a computing system, such as a PC, mobile devices (e.g., cell phones, pagers, digital music players, mobile media centers), a PDA, and/or other computing devices of the users, and that communicate with the account management system (100) via one or more network connections and protocols. Regardless of the architecture of the system, communications between the account management system (100) and the interface may be secure, as described above.

The financial rules (135) (e.g., financial rule A (136) and financial rule N (137)) stored in the financial rules repository (130) correspond to rules for managing requests for financial transactions associated with the financial accounts (140). The financial rules (135) may be used to determine whether to authorize or deny a transaction. For example, the financial rules may include fraud detection rules defined or selected by the account owner (and/or an associated financial institution) that specify authorized vendors, authorized amounts, authorized users, authorized geographic regions for transactions, authorized purchase categories, and/or other relevant rules. A financial rule (135) may also define a combination of the above rules. For example, if a financial account is shared by a parent and a dependant child in college, the financial rule may specify different authorized amounts for different geographic regions, i.e., a first amount for the city of the child's college and a second amount for the city of the parent's residence.

In one or more embodiments of the invention, the above financial rules (135) may dynamically change based on a balance associated with a financial account. For example, a financial rule may require denial of requests for entertainment-related financial transactions when the balance in a checking account is less than five hundred dollars. Further, the financial rule may require approval of requests for entertainment related financial transactions when the balance in the checking account is above five hundred dollars. In one or more embodiments of the invention, a financial rule (135) may define one or more actions that may be taken in response to a violation of a financial rule (135). For example, a violation of a financial rule may require denial of the requested financial transaction, an authorization of the request with an alert sent to the account owner, and/or contacting the account owner to obtain verbal permission for authorizing the request for the financial transaction.

Continuing with FIG. 1, in one or more embodiments of the invention, a financial rule (135) may govern the redirection of a primary transaction request from a holding account (120) to a financial account (140) associated with an account owner. For example, a financial rule may require insurance payments and mortgage payments be routed to a joint account between two spouses, whereas a client entertainment expense be routed to the business account associated with the account owner. Another example of a financial rule may involve requiring the routing of jewelry expenses to a wife's account, car tools to a husband's account, and home expenses to a joint account. Furthermore, in one or more embodiments of the invention, a priority or ranking of financial accounts (140) and an order in which the financial accounts (140) are to be used may be defined by the financial rules (135). For example, when an authorized financial account has insufficient funds, the financial rules may define an order of other financial accounts to be used for fund transfers depending on available funds of each financial account.

In one or more embodiments of the invention, a financial rule (135) may require the execution of a secondary transaction request (112) related to the primary transaction request (110). For example, when an account owner authorizes a financial account (e.g., a credit card account or a checking account) with insufficient available funds to cover a charge, a financial rule may require transfer of funds into the authorized financial account from a different financial account (e.g., a savings account). In one or more embodiments of the invention, a financial rule (135) may use an account owner's information to govern transfer of funds and/or manage requests for financial transactions. For example, when an account owner authorizes a financial account with insufficient available funds and an automatic paycheck deposit is due to be deposited the next day; the financial rule, in this case, may require holding the request for the financial transaction temporarily in the holding account (120) and routing the request to the financial account once sufficient funds are deposited. Alternatively, a financial rule (135) may require obtaining a loan from a different financial account or a pre-approved bank and returning the money as soon as the funds from the automatic paycheck are received. Each of the above transactions could be considered a secondary transaction request (112), which may be performed on the financial account (140) directly or may be routed back through the account management system (100) as a primary transaction request (110).

A financial rule (135) may also require transfer of funds between different financial accounts (140) to increase the rate of return. For example, a financial rule may require a transfer of $1000 out of the checking account into a six month Certificate of Deposit (CD) account each time the checking account goes over five thousand dollars. Another example involves a financial rule that requires automatically transferring a specified amount of money into a financial account prior to a major payment (e.g., a schedule mortgage payment, insurance payment, utilities payment), and transferring a portion or all of the remaining balance into a high yield account after the major payment has been completed. Again, each of the above transactions could be considered a secondary transaction request (112).

Continuing with FIG. 1, the transaction management engine (124) corresponds to a process, program or system for managing financial accounts (140) based on the financial rules (135). As shown in FIG. 1, the transaction management engine (124) includes a transaction router (122) and a holding account (120).

In one or more embodiments of the invention, the transaction router (122) includes functionality to obtain a primary transaction request (110) and route the transaction from the holding account (120) to the financial accounts (140) based on financial rules (135). The transaction router (122) may intercept a primary transaction request (110) associated with one or more financial accounts (140). For example, when a primary transaction request (110) is made for a particular financial account associated with the account owner, the transaction router may obtain the primary transaction request (110) prior to processing by the particular financial account.

In one or more embodiments of the invention, the transaction router (122) may also obtain a primary transaction request (110) that does not specify a particular financial account (140) but directly specify the holding account (120). In one or more embodiments of the invention, the transaction router (122) may include functionality to route a request for a financial transaction to one or more of the financial accounts (140) based on instructions from the transaction management engine (124). For example, a transaction router (122) may route a primary transaction request (110) from the holding account (120) by distributing different portions of the amount to different financial accounts (140).

One specific example, may involve a paycheck deposit obtained by the transaction router (122). In this case, the transaction router (122) may distribute funds attributed to a paycheck from the holding account (120) using the following distribution: 5% to a college savings account, 10% to a savings account, and 85% to a checking account associated with the account owner. The transaction router (122) may also distribute the debits or credits from the holding account (120) based on the balance associated with each financial account (140). The transaction router (122) may also reject the request for a financial transaction, e.g., if the request violates a financial rule. Further, the transaction router (122) may hold a primary transaction request (110) for a period of time and thereafter route or deny the primary transaction request (110).

Continuing with FIG. 1, the transaction management engine (124) corresponds to a process, program, or system that includes functionality to evaluate a primary transaction request (110) based on the financial rules (135), discussed above. The transaction management engine (124) may include functionality to evaluate one or more rules to determine whether to route the request, hold the request (e.g., until the occurrence of an event), and/or deny the request. For example, the transaction management engine (124) may deny the primary transaction request (110) if the request violates a financial rule (135).

In one or more embodiments of the invention, the transaction management engine (124) may include functionality to generate one or more secondary transaction requests (112) based on an evaluation of the financial rules (135). A secondary transaction requests (112) may include, but is not limited to, requests to transfer of fund before and/or after execution of the requested (i.e., primary) financial transaction, requests to acquire a pre-approved loan on behalf on the account owner, requests to deposit into a pre-approved investment account, requests to provide one or more offers (e.g., for loans or investments) to the account owner, and/or requests for other financial transactions associated with the financial accounts (140) and the primary transaction request (110).

As an example, an account owner may maintain an open line of credit from a financial institution which may be used by the transaction management engine if a financial account has insufficient funds to cover a charge authorized by the account owner. In one or more embodiments of the invention, the secondary transaction request may involve the transfer of funds associated with a reserve financial account. In this case, when an account owner makes a purchase using a credit account (e.g., a loan or credit card), the transaction management engine may remove the equivalent dollar amount from a debit account (e.g., checking or savings account) and save the equivalent dollar amount in a reserve financial account to pay off the credited amount (immediately or at a later date). This may allow an account owner to retain the benefits provided with a credit account (e.g., frequent flyer miles) while using the safety of using a debit account (e.g., staying out of debt).

Figure 2:
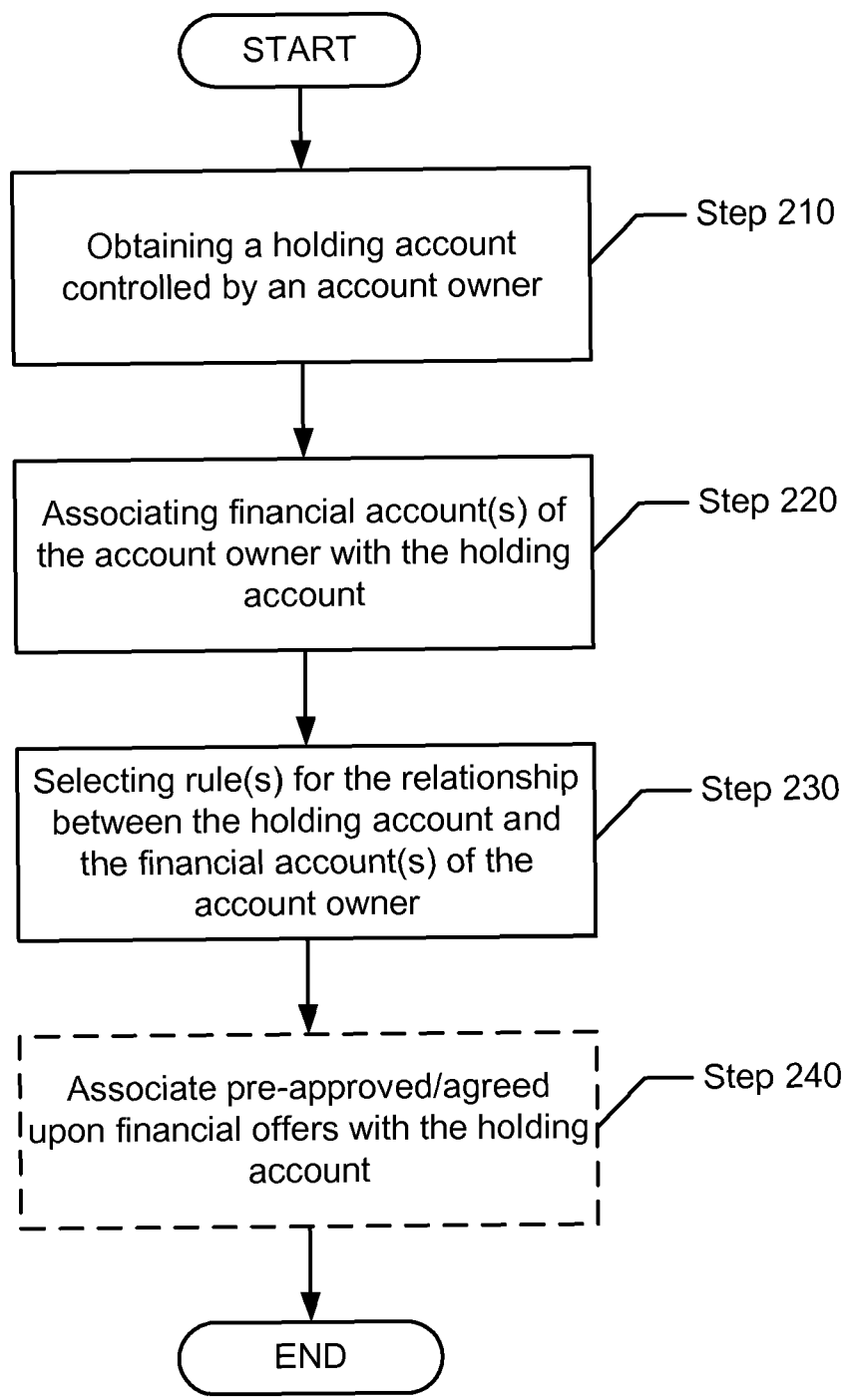
FIGS. 2 and 3 show a flow chart in accordance with one or more embodiments of the invention.
Figure 3:
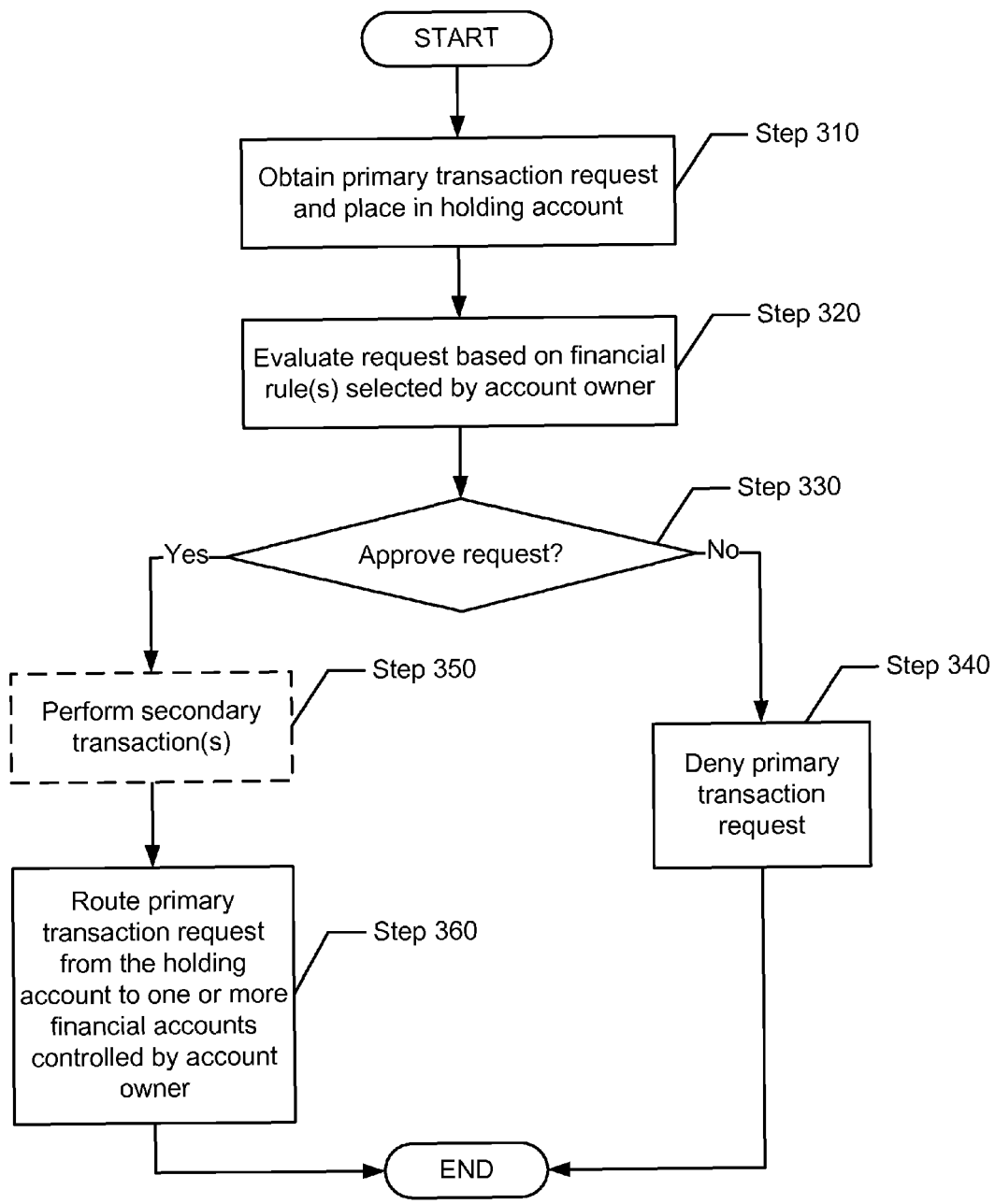

FIGS. 2 and 3 show flow charts in accordance with one or more embodiments of the invention. In one or more embodiments of the invention, one or more of the steps described below may be omitted, repeated, and/or performed in a different order. Accordingly, the specific arrangement of steps shown in FIGS. 2 and 3 should not be construed as limiting the scope of the invention.

Specifically, FIG. 2 shows a flow chart for setting up a holding account and the relationships with one or more financial accounts. Initially, the holding account is obtained based on authorization from an account owner to manage the finances of the account owner (Step 210). In one or more embodiments of the invention, the holding account is controlled by the account owner and may be obtained by generating a new account designated by account owner, by converting an established account to act as a holding account, or other means to obtain an account that is able to function as a holding account. Further, the holding account may be obtained as part of a service provided by a financial institution or using a third party independent application that interacts with one or more financial institutions.

In one or more embodiments of the invention, the holding account may be configured with different permissions set for different users. For example, the holding account may be configured to restrict modification rights to the account owner. Alternatively, modification rights may be given to one or more entities affiliated with the account owner. The holding account may configured with an account number (e.g., a credit card number or a combination of routing & account number) in order to directly receive requests for financial transactions. In another embodiment of the invention, the holding account may be configured to be invisible to an external party and accordingly may not be setup with an account number that can be referred to, for example, by a vendor. In this case, the holding account would intercept transactions intended for one or more associated financial accounts prior to the transaction actually reaching the financial account(s).

Next, the holding account is associated with one or more financial accounts controlled by the account owner, in accordance with one or more embodiments of the invention (Step 220). The account owner may select any number of financial accounts to be associated with the holding account and define relationships between the holding account and the associated financial accounts. For example, an account owner may designate a financial account as a "deposit only" account, a "withdrawal only" account, or a combination of deposit and withdrawal capabilities. Accordingly, the holding account may be limited in functionality based on the associations by the account owner.

In one or more embodiments of the invention, one or more rules are selected governing the relationship between the holding account and one or more financial accounts of the account owner (Step 230). The financial rules may be defined by the account owner or selected from pre-defined rules. The financial rules may also be defined by using prior transactions selected by the account owner. For example, various transactions by an account owner associated with multiple financial accounts and financial institutions may be uploaded into a system by the account owner and analyzed by the system to determine a set of financial rules. In this example, an authorized vendor rule may be defined to include all the vendors previously used by the account owner. Another example may involve, a maximum amount rule defined by the maximum amount of any single prior transaction. In one or more embodiments of the invention, the financial rules selected by the account owner may be combined with financial rules selected by a financial institution.

Continuing with FIG. 2, in one or more embodiments of the invention, an account owner may associate pre-approved offers with the holding account (Step 240). For example, the account owner may select loan offers and/or investment opportunities as potential financial accounts. In order to select the offers, the account owner may either be pre-approved or in agreement with associated financial institutions. The selected loan offers and/or investment opportunities may then be activated at any later point based on associated financial rules. For example, loan offers may be pre-approved and selected for fund shortages. Another example may involve the selection of one or more investment opportunities for transferring funds when a financial account reaches a predetermined amount.

FIG. 3 shows a flow chart for managing a financial account in accordance with one or more embodiments of the invention. Initially, a primary transaction request for a financial transaction is obtained and placed into a holding account (Step 310). The primary transaction request may be obtained directly from a financial transaction requestor to the holding account, or may be intercepted/redirected from a financial account associated with an account owner to the holding account. In one or more embodiments of the invention, requests for financial transactions associated with any financial account of an account owner may be collected and routed to the holding account for evaluation.

Next, the obtained primary transaction request is evaluated based on a financial rule selected by an account owner (Step 320). The primary transaction request may be evaluated by comparing one or more attributes associated with the primary transaction request for the financial transaction with the financial rules associated with the relevant financial account(s). For example, a transaction amount of the primary transaction request may be used as a comparison value to determine whether the primary transaction request satisfies the rule. The evaluation of the rules may include a comparison of the actual value with different ranges and performing an action based on the range of the actual value. Furthermore, evaluation of a financial rule may result in the evaluation of nested financial rules. In one or more embodiments of the invention, if applicable financial rules are not found for evaluation of the request (e.g., financial amount is not within specified ranges or the account owner has not selected a specific rule/criteria), a predetermined default action may be used (e.g., denial of request).

Based on the evaluation of the primary transaction request, a determination is made whether to approve the primary transaction request (Step 330). In one or more embodiments of the invention, the primary transaction request may be denied (Step 340), or temporarily suspended/delayed (not shown) for reevaluation at a later point. Once a primary transaction request is approved, any necessary secondary financial transactions are performed (Step 350). For example, funds may be transferred from one financial account to another financial account for proper execution of the requested transaction. In other words, if the primary transaction request requires a withdrawal in excess of available funds in a primary account, one or more secondary transactions (sending secondary transaction requests) may be performed to transfer sufficient funds into the primary account from one or more financial accounts. Although shown as being performed after request approval, a secondary transaction may be performed at any time, in accordance with one or more embodiments of the invention. For example, a secondary transaction may be performed prior to request approval to calculate total available funds associated with an account owner or performed after routing the primary transaction request shown in Step 360. Another example may involve performing a secondary transaction after denial of the request, freezing a financial account that is deemed to be compromised to fraudulent practices. Further, the secondary transaction may be treated as a primary transaction request and be routed back to Step 310 and processed accordingly.

Next, the primary transaction request from the holding account to one or more financial accounts controlled by the account owner (Step 360). Redirecting the primary transaction request to a particular financial account may include transmitting the primary transaction request to a financial entity associated with the relevant financial account. Redirecting the primary transaction request to the financial account may also involve distributing the request to multiple accounts. For example, the different portions of an authorized charge may be distributed to different financial accounts, in effect, spreading out the charge over multiple financial accounts. For example, a couple may distribute the purchase charge of a vehicle to a card associated with the holding account. In turn, the holding account may distribute 50 percent of the charge to the first spouse's account and 50 percent of the charge to the second spouse's account, thereby taking advantage of the available credit limits and interest rates available for those accounts.

Figure 4:
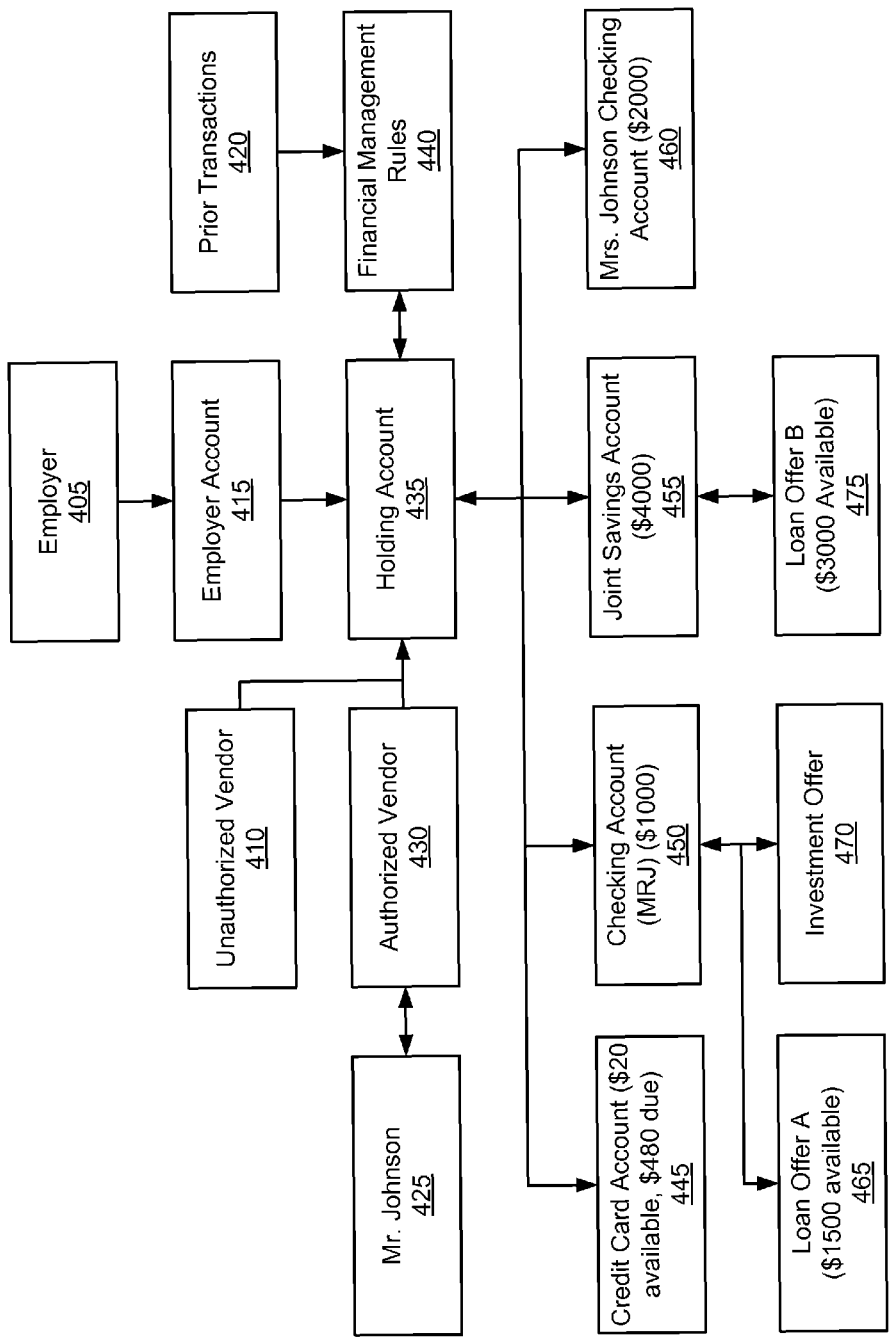
FIG. 4 show an exemplary use for a holding account in accordance with one or more embodiments of the invention.

FIG. 4 shows an exemplary framework for using a holding account as part of an account management system (100 in FIG. 1). In this example, Mr. Johnson (425) uses the holding account (435) to handle all affiliated financial accounts and transactions associated with the financial accounts. Mr. Johnson (425) first selects prior transactions (420) that are representative of Mr. Johnson's financial activity and authorized creation of the financial management rules (440) for use by the holding account (435).

Next, Mr. Johnson (425), associates credit card account (445), checking account (450), joint savings account (455) (with Mrs. Johnson), and Mrs. Johnson's checking account (460) (with approval & agreement by Mrs. Johnson) with the holding account (435). Furthermore, Mr. Johnson (425) accepts loan offer A (465) and investment offer (470) linked to checking account (450), which effectively links those offers to the holding account (435). Based on the financial rules, the loan offer A (465) corresponds to an open line of credit that can be activated and used when checking account (450) has insufficient funds and investment offer (470) is for investing when the checking account (450) reaches a balance over ten thousand dollars.

Mr. Johnson and Mrs. Johnson also approved loan offer B (475) associated with the joint savings account (455) should a contemplated transaction with joint savings account (455) result in a lack of sufficient funds in the account. Lastly, Mr. Johnson and Mrs. Johnson agreed to use Mrs. Johnson's checking account (460), when all of Mr. Johnson's financial sources are exhausted.

Next, Mr. Johnson linked the employer account (415) to the holding account for distributing a paycheck into Mr. Johnson's checking account (450) and the joint savings account (455). Once the framework setup is complete, all deposits and charges to Mr. Johnson's multiple accounts may be managed by the holding account (435) and controlled by Mr. Johnson (425) through modifications to the set of financial management rules (440). For example, if Mr. Johnson (425) requires $1000 each pay period to pay expense, then $1000 is routed from the holding account (435) to the checking account (450). Any remaining funds may then be routed to the joint savings account (455) to take advantage of interest payments afforded to the savings account that is not possible with the checking account (450). Similarly, if both Mrs. Johnson's checking account (460) and the joint savings account (450) both offer interest rates, the financial management rules (440) may dictate that the primary transaction request in the holding account (435) be distributed in a manner to maximize the interest earned from the remaining funds (e.g., by routing all the funds into the higher interest rate account, by keeping the minimum balance above a level to earn a higher interest rate (or any interest).

Continuing with the example, once the framework is established, the holding account (435) receives two primary transaction requests, the first request for a $50 debit from an unauthorized vendor (410) and the second request for a $3,000 debit from an authorized vendor (430). Initially, the request from the unauthorized vendor (410) is deemed fraudulent because the financial management rules (440) associated with the holding account (435) limit all purchases by Mr. Johnson (425) to a geographical locality of within the state of California. Because the unauthorized vendor (410) is based in Nevada, the first request from the unauthorized vendor (410) held in the holding account (435) is denied (prior to being sent to one of Mr. Johnson's financial accounts) and an alert is sent to Mr. Johnson (425) indicating an unauthorized request. Next, the second request from the authorized vendor (430) is approved by Mr. Johnson (425) (based on the financial management rules (440)) because the second request is from one of Mr. Johnson's regular vendors located in California. As an approved primary transaction request, the second request is then evaluated to determine which financial account to debit the $3000. In the example, the transaction is intended for the checking account (450). However, the selected financial account (checking account (450)) is determined to hold insufficient funds to cover the $3,000 debit.

Based on the category of the transaction, the financial management rules (440) dictate the order in which the financial account(s) controlled by Mr. Johnson (425) are accessed. For the purposes of this example, the financial management rules dictate that the second request access the financial accounts in the following order: (1) checking account (450), (2) loan offer A (465), (3) joint savings account (455), (4) loan offer B (475), (5) Mrs. Johnson checking account (460), and taking a cash advance of the credit card account (445). Accordingly, prior to routing the second request from the holding account (435) to the checking account (450), multiple secondary transactions are performed to obtain $1500 from the pre-approved loan offer A (465) and obtain $500 from the joint savings account (455). Another secondary transaction is performed to transfer the $2000 to the checking account (450). Following the transfer of $2000, the checking account (450) is determined to hold sufficient funds to cover the $3,000 charge authorized by Mr. Johnson (425). Accordingly, the holding account (435) routes the second request to the checking account (450). Subsequently, the checking account (450) is debited and Mr. Johnson (425) makes the requested purchase from the authorized vendor (430).

Figure 5:
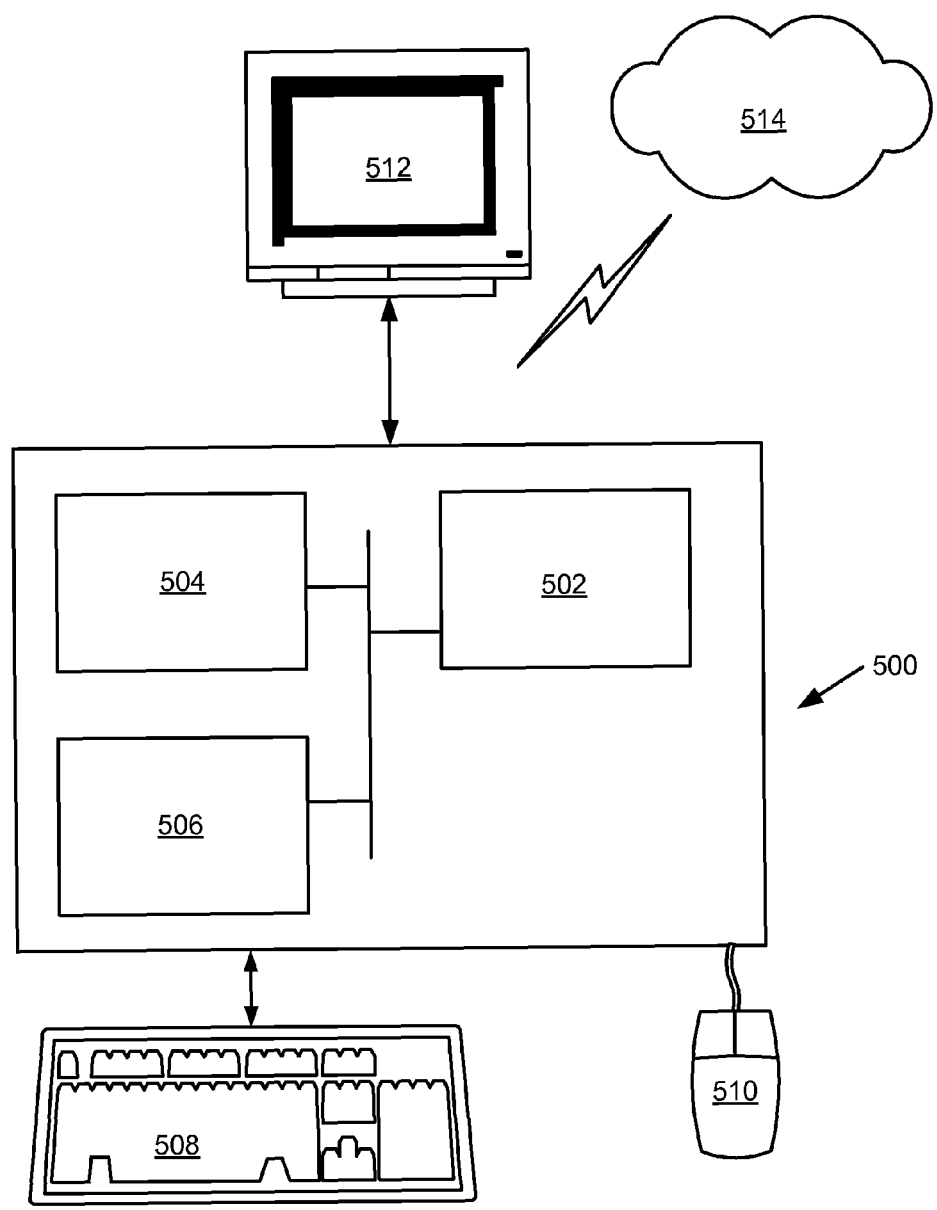
FIG. 5 shows a computer system in accordance with one or more embodiments of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a LAN or a WAN (e.g., the Internet) (514) via a network interface connection. Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., object store layer, communication layer, simulation logic layer, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc, a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing financial transactions, comprising:
   directing, by a hardware processor, a first debit transaction request from a first vendor and destined for a financial account controlled by an account owner to a holding account controlled by the account owner, wherein the first debit transaction request comprises a first amount;
   identifying, by the hardware processor, a maximum pre-authorized amount associated with the holding account, wherein the first amount is greater than the maximum pre-authorized amount;
   identifying, by the hardware processor, a list of authorized vendors;
   verifying, by the hardware processor and in response to the first debit transaction request exceeding the maximum pre-authorized amount, that the first vendor is among the list of authorized vendors; and
   routing, by the hardware processor, the first debit transaction request, in response to verifying that the first vendor is among the list of authorized vendors, from the holding account to the financial account controlled by the account owner.

2. The method of claim 1 further comprising:
   adding a new vendor to the list of authorized vendors.

3. The method of claim 1, wherein the maximum pre-authorized amount is set by the account owner.

4. The method of claim 1, wherein the list of authorized vendors is associated with the holding account.

5. The method of claim 1 further comprising:
   directing a second debit transaction request from a second vendor to the holding account, wherein the second debit transaction request comprises a second amount exceeding the maximum pre-authorized amount; and
   denying the second debit transaction request in response to the list of authorized vendors lacking the second vendor.

6. A system for processing financial transactions, comprising:
   a hardware processor;
   a holding account associated a plurality of financial accounts and controlled by an account owner;
   a financial rules repository storing a list of authorized vendors;
   a transaction management engine (TME) executing on the hardware processor and configured to:
      direct a first debit transaction request from a first vendor and destined for a financial account controlled by the account owner to the holding account, wherein the first debit transaction request comprises a first amount,
      identify a maximum pre-authorized amount associated with the first financial account, wherein the first amount is greater than the maximum pre-authorized amount, and
      verify, in response to the first debit transaction request exceeding the maximum pre-authorized amount, that the first vendor is among a list of authorized vendors; and
   a transaction router comprising functionality to route the first debit transaction request, based on the evaluation and in response to verifying that the first vendor is among the list of authorized vendors, from the holding account to the financial account controlled by the account owner.

7. The system of claim 6, wherein the TME is further configured to:
   receive input associated with a new vendor from the account owner; and
   add the new vendor to the list of authorized vendors.

8. The system of claim 6, wherein the maximum pre-authorized amount is defined by the account owner.

9. The system of claim 6, wherein the list of authorized vendors is associated with the holding account.

10. The system of claim 6, wherein the TME is further configured to:
    direct a second debit transaction request from a second vendor to the holding account, wherein the second debit transaction request comprises a second amount exceeding the maximum pre-authorized amount, and
    deny the second debit transaction request in response to the list of authorized vendors lacking the second vendor.

11. A non-transitory computer readable medium comprising instructions for processing financial transactions, the instructions comprising functionality for:
    directing a first debit transaction request from a first vendor and destined for a financial account controlled by an account owner to a holding account controlled by the account owner, wherein the first debit transaction request comprises a first amount;
    identifying a maximum pre-authorized amount associated with the holding account, wherein the first amount is greater than the maximum pre-authorized amount;
    identifying a list of authorized vendors;
    verifying, in response to the first debit transaction request exceeding the maximum pre-authorized amount, that the first vendor is among the list of authorized vendors; and
    routing the first debit transaction request, in response to verifying that the first vendor is among the list of authorized vendors, from the holding account to the financial account controlled by the account owner.

12. The non-transitory computer readable medium of claim 11, wherein the plurality of instructions further comprise functionality to:
    add a new vendor to the list of authorized vendors.

13. The non-transitory computer readable medium of claim 11, wherein the maximum pre-authorized amount is defined by the account owner.

14. The non-transitory computer readable medium of claim 11, wherein the list of authorized vendors is associated with the holding account.

15. The non-transitory computer readable medium of claim 11, wherein the plurality of instructions further comprise functionality to:
    direct a second debit transaction request from a second vendor to the holding account, wherein the second debit transaction request comprises a second amount exceeding the maximum pre-authorized amount;
    deny the second debit transaction request in response to the list of authorized vendors lacking the second vendor.

* * * * *